(12) United States Patent
Schroll et al.

(10) Patent No.: US 12,486,068 B2
(45) Date of Patent: Dec. 2, 2025

(54) VACUUM TRANSFER CYLINDER WITH SUCTION BAR CIRCUIT

(71) Applicant: KRONES AG, Neutraubling (DE)

(72) Inventors: Bernd Schroll, Neutraubling (DE); Gabriel Seibold, Neutraubling (DE); Christian Holzer, Neutraubling (DE); Soeren Meissner, Neutraubling (DE)

(73) Assignee: KRONES AG, Neutraubling (DE)

( * ) Notice: Subject to any disclaimer, the term of this patent is extended or adjusted under 35 U.S.C. 154(b) by 40 days.

(21) Appl. No.: 18/246,011

(22) PCT Filed: Aug. 4, 2021

(86) PCT No.: PCT/EP2021/071746
§ 371 (c)(1),
(2) Date: Mar. 20, 2023

(87) PCT Pub. No.: WO2022/058088
PCT Pub. Date: Mar. 24, 2022

(65) Prior Publication Data
US 2023/0356874 A1 Nov. 9, 2023

(30) Foreign Application Priority Data
Sep. 21, 2020 (DE) .................... 10 2020 124 490.8

(51) Int. Cl.
*B65C 9/18* (2006.01)
*B65H 29/40* (2006.01)

(52) U.S. Cl.
CPC ........... *B65C 9/1819* (2013.01); *B65H 29/40* (2013.01); *B65H 2406/3452* (2013.01);
(Continued)

(58) Field of Classification Search
CPC .... B65H 2406/3452; B65H 2406/3454; B65H 31/10; B65H 29/40; B65H 2801/75; B65C 9/1819
See application file for complete search history.

(56) References Cited

U.S. PATENT DOCUMENTS

| 4,632,721 A | 12/1986 | Hoffman et al. |
| 2018/0186493 A1* | 7/2018 | Hafner .................... B29C 66/90 |
| 2021/0380303 A1* | 12/2021 | Niehoff ................. B65C 9/1819 |

FOREIGN PATENT DOCUMENTS

| AU | 6101586 A | 4/1987 |
| DE | 1586388 A1 | 5/1970 |

(Continued)

OTHER PUBLICATIONS

ISA European Patent Office, International Search Report Issued in Application No. PCT/EP2021/071746, Dec. 3, 2021, WIPO, 4 pages.

*Primary Examiner* — Scott W Dodds
(74) *Attorney, Agent, or Firm* — McCoy Russell LLP

(57) ABSTRACT

The invention relates to a labelling device for attaching labels to containers, comprising: at least one unrolling device for a label strip; at least one cutting tool for cutting the label strip into individual labels; a vacuum transfer cylinder for transferring the labels onto the containers, wherein the vacuum transfer cylinder has a plurality of movable vacuum suction for suctioning, conveying and transferring the labels, wherein at least one vacuum suction bar is assigned to each label to be transported; at least one bar controller for controlling the movement of the vacuum suction bars, wherein the bar controller comprises at least one control cam which, in cooperation with at least one control roller of a vacuum suction bar, controls the movement of the respective vacuum suction bar.

10 Claims, 3 Drawing Sheets

(52) U.S. Cl.
CPC .... *B65H 2701/192* (2013.01); *B65H 2801/75* (2013.01); *Y10T 156/1771* (2015.01)

(56) References Cited

FOREIGN PATENT DOCUMENTS

| | | |
|---|---|---|
| DE | 202012003268 U1 | 5/2012 |
| DE | 102015214011 A1 | 1/2017 |
| DE | 102018130318 B3 | 11/2019 |
| DE | 102019121445 A1 | 2/2021 |
| EP | 0261861 A2 | 3/1988 |
| GB | 1217529 A | 12/1970 |
| JP | S61164934 A | 7/1986 |

* cited by examiner

VACUUM TRANSFER CYLINDER WITH SUCTION BAR CIRCUIT

CROSS REFERENCE TO RELATED APPLICATIONS

The present application is a U.S. National Phase of International Application No. PCT/EP2021/071746 entitled "VACUUM TRANSFER CYLINDER WITH SUCTION BAR CIRCUIT," and filed on Aug. 4, 2021. International Application No. PCT/EP2021/071746 claims priority to German Patent Application No. 10 2020 124 490.8 filed on Sep. 21, 2020. The entire contents of each of the above-listed applications are hereby incorporated by reference for all purposes.

TECHNICAL FIELD

Prior Art

The invention relates to a labeling unit, to a labeling machine, as well as to a method for applying labels onto containers as described in the following description.

Background and Summary

Labels are typically applied to containers or packaging using labeling units in order to label them according to the content.

For labeling containers, such as beverage bottles or the like, it is known, for example, from DE 20 2012 003 268 U1 or DE 10 2015 214 011 A1, to first separate sheet-shaped labels from an endless label strip provided from a roll in a cutting unit and to then transfer the labels to a continuously rotating vacuum transfer cylinder which applies the labels to the containers. When the labels are being transported on the vacuum transfer cylinder, they can additionally have glue applied to them at the leading part and the end of the label, if necessary. For receiving, transporting, and applying the labels to the containers, the vacuum transfer cylinder has switchable movable suction bars for suctioning, holding, and transporting the labels for the lateral leading and end regions of the labels.

These switchable and movable suction bars can be selectively switched, for example, from an outer radial work position, in which, for example, the suction bars guide the label section that they are holding against a glue application device located in the periphery of the vacuum transfer cylinder to an inner alternative position, for example, to prevent a collision with the glue application device.

However, known mechanisms or circuits for switching suction bars of vacuum transfer cylinders are too sluggish and slow and limit the productivity and capacity of labeling units or labeling machines and/or make labeling units or labeling machines highly susceptible to failure due to collisions of suction bars that do not move away quickly enough and have components of the labeling unit or have components of the labeling machine that are in the immediate vicinity of the vacuum transfer cylinder.

OBJECT

It is therefore the object of the invention to improve a labeling unit or a labeling machine or a method for applying labels onto containers, respectively, in particular with regard to the efficiency, performance, productivity, capacity, robustness and susceptibility to failure of the labeling unit or the labeling machine or the labeling process.

Solution

This is satisfied according to the invention by a labeling unit, a labeling machine, and a method as described herein.

An exemplary labeling unit can comprise one, some, or all of the following components or features, respectively:
- at least one roll-off device for a label strip,
- at least one cutting unit for cutting the label strip into individual labels,
- at least one vacuum transfer cylinder for transferring the labels to the containers, where the vacuum transfer cylinder can have a plurality of movable vacuum suction bars for suctioning, conveying, and transferring the labels, where at least one vacuum suction bar can respectively be associated with each label to be transported,
- at least one bar controller for controlling the motion of the vacuum suction bars, where the bar controller can comprise at least one control cam which, in interaction with at least one control roller of a vacuum suction bar, can control the motion of the respective vacuum suction bar,
- and where the at least one vacuum suction bar associated with a label to be transported can be controlled by a control cam of the bar controller or where all vacuum suction bars associated with a label to be transported can be controlled by a control cam of the bar controller.

The exemplary labeling unit can additionally comprise at least one glue application device for applying glue onto labels on the vacuum transfer cylinder before the labels are transferred to the containers.

Said exemplary vacuum suction bars can also be referred to as vacuum bars or suction bars.

Said exemplary bar controller can also be referred to as a bar circuit.

Exactly one vacuum suction bar or at least one vacuum suction bar or a plurality of vacuum suction bars can be associated with a label to be transported.

A vacuum bar can be formed integrally or from one part or from several parts.

For example, different regions or different parts of an individual vacuum suction bar can be associated with different regions of a label, for example, a leading region of a label to be transported and/or an end region of a label to be transported and/or a middle region of a label to be transported.

It is also conceivable that at least two vacuum suction bars can respectively be associated with a/each label to be transported, and where one of the at least two vacuum suction bars respectively associated with a label to be transported can be configured for a leading region of a/the label to be transported and another of the at least two vacuum suction bars respectively associated with a label to be transported can be configured for an end region of a/the label to be transported.

It is likewise conceivable, for example, that at least three vacuum suction bars can be respectively associated with a/each label to be transported, and where one of the at least three vacuum suction bars respectively associated with a label to be transported can be configured for a leading region of a/the label to be transported and another of the at least three vacuum suction bars respectively associated with a label to be transported can be configured for a middle region of a/the label to be transported and another of the at least three vacuum suction bars respectively associated with a label to be transported can be configured for an end region of a/the label to be transported.

These exemplary three vacuum suction bars can be referred to, inter alia, as the leading bar, middle bar, and end bar.

This can inter alia facilitate handling and processing labels that are longer or wider as compared to standard labels since, for example, the labels can be held better on the vacuum transfer cylinder.

For example, labels with heights between 20 and 260 mm and with lengths between 120 and 700 mm can be processed with a labeling unit described herein or with a vacuum transfer cylinder described herein.

The exemplary vacuum suction bars, in particular the longitudinal axes of the exemplary vacuum suction bars, can be oriented or arranged parallel or obliquely or orthogonally to the longitudinal axis or axis of rotation of the vacuum transfer cylinder.

For example, a vacuum suction bar that is oriented or arranged obliquely or orthogonally to the longitudinal axis or axis of rotation of the vacuum transfer cylinder and that can be associated with a label to be transported can be oriented in such a way that the longitudinal axis of the vacuum suction bar extends substantially over part or over a large part or over the entire length of a/the label to be transported.

It is also possible that, for example, the longitudinal axes of the exemplary vacuum suction bars of a vacuum transfer cylinder can be oriented or arranged substantially parallel or exactly parallel to the longitudinal axis or axis of rotation of the vacuum transfer cylinder so that a longitudinal axis of the vacuum suction bar can respectively extend substantially over a part or over a large part or over the entire width or height, respectively, of a/the label to be transported.

As mentioned, the vacuum suction bars are movable and their motion can be effected by a/the bar controller. The motion of the vacuum suction bars can be understood to mean in particular a radial motion of the vacuum suction bars in relation to the longitudinal axis or axis of rotation, respectively, of the vacuum transfer cylinder. In particular, the radial motion of the vacuum suction bars can take place between two different work positions or working bearings of the vacuum suction bars. For example, the vacuum suction bars can each have an outer work position and an inner work position, where the radial distance of a vacuum suction bar from the longitudinal axis or axis of rotation of the vacuum transfer cylinder in the outer work position is greater than the radial distance of a vacuum suction bar from the longitudinal axis or axis of rotation of the vacuum transfer cylinder in the inner work position.

The motion of the vacuum suction bars between the different exemplary work positions can also be referred to inter alia as switching the vacuum suction bars over.

The outer work position can be understood to be, for example, the proper work position or initial position of the vacuum suction bars. The vacuum suction bars can be, for example, resiliently preloaded against a stop in the outer position. In the outer work position, the vacuum suction bars can, for example, guide the suctioned label regions against a glue roller of a glue application device and/or to be able to receive labels and/or to be able to press labels onto/against a container.

In contrast, the inner work position disposed radially inwardly can be understood to be an alternative position for the vacuum suction bars.

Unloaded vacuum suction bars, i.e. vacuum suction bars that are not in contact with a label or label region or that do not hold or transport a label or label region, can be temporarily switched or switched back to the inner work position or alternative position, respectively, e.g. to avoid a collision with possible components along the periphery of the vacuum transfer cylinder.

The bar controller for controlling the motion or for switching the vacuum suction bars can comprise at least one control cam or lifting control cam which, in interaction with at least one control roller or roller cam of a vacuum suction bar or with at least one control roller coupled to a vacuum suction bar, respectively, controls the motion or the switching, respectively, of the respective vacuum suction bar.

This exemplary control cam or the exemplary control cams can there be arranged in a fixed position below the vacuum transfer cylinder, i.e. they do not co-rotate with the vacuum transfer cylinder, but can be configured to be shiftable or switchable in their horizontal and/or vertical orientation or position.

In other words, the control cams can be switched into the travel path of the control roller(s) or roller cam(s), respectively, of a vacuum suction bar (i.e. e.g. the control rollers run past and contact the control cam/roller cams and the vacuum suction bar is switched) or are switched away from the travel path of the control roller (s) or roller cam(s), respectively, of a vacuum suction bar (i.e. e.g. the control cams run past the control cam/the control cams without contact and the vacuum suction bar is not switched).

As mentioned, the motion of the at least one vacuum suction bar associated with a label to be transported can be controlled by a control cam of the bar controller or all vacuum suction bars associated with a label to be transported can be controlled by a control cam of the bar controller, respectively.

In other words, all of the vacuum suction bars respectively associated with a label to be transported can be moved and controlled by a single control cam of the bar controller or by exactly one control cam of the bar controller, respectively.

Incidentally, this refers to a respective specific position or to a specific work region of the vacuum transfer cylinder or to a specific point in time/specific time window, respectively, and does not rule out that the one vacuum suction bar or all vacuum suction bars respectively associated with a label to be transported can also be controlled at a different point in time/at a different position by a further different control cam of the bar controller.

The number of vacuum suction bars respectively associated with a label to be transported can furthermore be referred to as a group of vacuum suction bars or simply as a group of bars, where this exemplary group, i.e. the group of vacuum suction bars or group of bars, can comprise at least one vacuum suction bar.

In other words, for example, at a given position of the vacuum transfer cylinder, e.g. in a specific work region or at a specific point in time/in a specific time window, the vacuum suction bars respectively associated with a label to be transported, i.e. the bars of a group of bars, are never moved and controlled by more than one control cam.

Depending on the division of the vacuum transfer cylinder, an exemplary vacuum transfer cylinder can have at least one or at least two, three, four, six or more groups of bars.

In other words, these exemplary groups of vacuum suction bars or group of bars can each be moved and controlled by a single control cam of the bar controller or by exactly one control cam of the bar controller, respectively.

This exemplary control cam or these exemplary control cams can there be arranged along a partial circle. This exemplary control cam or these exemplary control cams can there also themselves be slideable and optionally brought to a desired definable position along said exemplary partial circle. For example, the control cam(s) can be mounted on a carrier plate in a slideable or pivotable manner. The control cam(s) can be movable horizontally and/or vertically.

By dispensing with the use of multiple control cams for controlling the vacuum suction bar(s) respectively associated with a label to be transported, the bar controller can be simplified and can be effected more effectively and quickly.

In particular, the time required to switch over the vacuum suction bars can be reduced, or the switching intervals of the vacuum suction bars can be shortened, respectively.

The vacuum transfer cylinder can therefore advantageously operate continuously at high rotational speeds without having to decelerate or stop.

This increases the production output over known labeling units or labeling machines, respectively.

For example, more than 11,000 labels per hour can be processed with a labeling unit described herein or a labeling machine described herein, respectively, where the vacuum transfer cylinder is able to rotate continuously, for example, at 3 or more revolutions per second.

In the labeling unit described herein, for example, at least two vacuum suction bars can be respectively associated with each label to be transported.

In addition, the bar controller can comprise, for example, at least two control cams which, in interaction with at least one control roller of a vacuum suction bar, can control the motion of the respective vacuum suction bar.

At least one of the vacuum suction bars associated with a label to be transported can have at least two control rollers which can be arranged in two different planes.

In addition, at least one of the vacuum suction bars associated with a label to be transported, e.g. a vacuum suction bar associated with a leading region of a/the label to be transported, can have only one control roller which can be disposed in one of the two planes mentioned above.

At least one control cam of the bar controller can then be associated with that plane in which one of the at least two control rollers of the vacuum suction bar having at least two control rollers is disposed, and at least one control cam of the bar controller can be associated with that plane in which a second one of the at least two control rollers of the vacuum suction bar having at least two control rollers is disposed.

The at least one bar controller can there be configured to respectively control the motion of the at least two vacuum suction bars associated with a label to be transported by way of one of the at least two control cams.

Both control cams can be arranged on partial circles having the same radius but in different planes and in different rotational angle positions of the vacuum transfer cylinder.

These different rotational angle positions of the vacuum transfer cylinder can be associated with, for example, different work regions of the vacuum transfer cylinder, for example, a label pick-up region, a label glue application region and a label transfer region.

As mentioned, all vacuum suction bars associated with a label can each be moved, controlled or switched by a single control cam.

The use of several planes offers the advantage inter alia that the vacuum suction bars associated with a label can be switched differently.

For example, a vacuum suction bar that is associated with a leading region of a label (leading bar) can be extended for or during the transfer of the label to a container or switched to the outer work position, while e.g. a vacuum suction bar that is associated with a middle or end region of a label (middle bar or end bar) can be retracted or can be switched or switched back to the inner work position.

This can enable inter alia a more fault-free label transfer to the container since, for example, a collision of the vacuum suction bars not associated with the leading region of the label, e.g. the middle or end bars, with the container and/or vacuum suction bars not associated with the leading region of the label getting tangled up with parts of the label applied to the container can be avoided.

This is particularly advantageous when processing labels that are particularly long as compared to standard labels.

By using several planes for the control rollers or the control cams, respectively, for controlling the vacuum suction bar(s) respectively associated with a label to be transported, the bar controller can also be more effective and faster, since inter alia, needless adjustment or shifting of control cams for switching the vacuum suction bars can be dispensed with.

It is furthermore conceivable that a labeling unit described herein or the bar controller described herein, respectively, comprises at least two control cams which can be arranged on two different partial circles having different radii, in particular, for example, at least one control cam arranged on an inner partial circle and at least one control cam arranged on an outer partial circle, where the outer partial circle has a larger radius than the inner partial circle.

The partial circles can then have a common center point, which can be disposed, for example, on the longitudinal axis or the axis of rotation, respectively, of the vacuum transfer cylinder or on an extension of the longitudinal axis or the axis of rotation of the vacuum transfer cylinder, respectively.

The control rollers or control cam rollers, respectively, of the vacuum suction bars associated with a label, or the control rollers or roller cams of a group of vacuum suction bars described above or herein, can be/are optionally associated with the exemplary inner partial circle or the exemplary outer partial circle of the control cams so that the control rollers or roller cams, respectively, of a group of vacuum suction bars or the vacuum suction bars associated with a label can optionally in interaction with the control cams tread [sic] on the exemplary inner partial circle or the exemplary outer partial circle in order to be able to be controlled or switched in this way.

This association of the control rollers of the vacuum suction bars associated with a label, or the association of the control rollers of a group of vacuum suction bars with an exemplary partial circle can then be fixed or variable or switchable, respectively, for example, in order to be able to associate control rollers of a group of vacuum suction bars with a specific partial circle in dependence of on the operating configuration.

In other words, different groups of vacuum suction bars or different groups of bars can be switched and controlled separately by different control cams along different partial circles or on different partial circles, respectively, for example, along an/the inner partial circle and/or an/the outer partial circle.

This can also contribute to enabling the vacuum suction bars to be switched faster or more flexibly, in particular switching vacuum suction bars back or away faster to avoid collisions with components in a peripheral work region of the labeling unit.

The labeling unit can therefore be operated faster and a higher performance and capacity of the labeling unit can be then obtained.

A labeling unit described above or herein can comprise, for example, at least two pairs of control cams, where the control cams of a pair of control cams are disposed on different partial circles, e.g. on an/the inner partial circle or on an/the outer partial circle.

The control cams of a pair of control cams can be disposed or be arranged, for example, in the same plane.

For example, the control cams of a pair of control cams can be disposed oppositely.

This exemplary possible common plane of the control cams of a pair of control cams can correspond to a/the plane in which at least one control roller of at least one of the vacuum suction bar(s) associated with a label to be transported can be disposed.

A labeling unit described above or herein can have, for example, a first pair of control cams in a first plane and a second pair of control cams in a second plane, where the second plane can differ from the first plane and where the second plane can correspond to a/the plane in which at least one control roller of at least one of the vacuum suction bar(s) associated with a label to be transported can be disposed.

The exemplary control cams or exemplary pairs of control cams, respectively, can be associated with different work regions of the labeling unit or different rotational angle positions of the vacuum transfer cylinder, respectively.

The exemplary labeling unit can have various components for handling and processing the labels which can be located, for example, along or in the vicinity of the periphery of the rotating vacuum transfer cylinder.

In particular, the labeling unit can comprise, for example, a glue application device for applying glue onto labels on the vacuum transfer cylinder.

A possible exemplary first pair of control cams can then be associated with, for example, a work region of the glue application device and a possible exemplary second pair of control cams can be associated with a further different work region, for example, a work region for transferring the labels to the containers.

If, for example, the rotating vacuum transfer cylinder is in a predeterminable rotational position range or if the vacuum suction bars of the rotating vacuum transfer cylinder associated with a label are in a predeterminable rotational position range, then the exemplary control rollers of the vacuum suction bars described herein can interact with the correspondingly associated and correspondingly arranged control cams or pairs of control cams, respectively, in order to switch said vacuum suction bars associated with a label or in order to switch a group of bars associated with a label, for example, to retract or switch back one or more vacuum suction bars.

Depending on the label format and/or depending on the type of container and/or depending on the distance from neighboring containers of a flow of containers that is fed to the labeling unit for applying labels and/or depending on the loading of the vacuum transfer cylinder with labels, the vacuum suction bars can be controlled quickly, e.g. be switched away quickly, in order to inter alia prevent collisions of the vacuum suction bars with components in the peripheral vicinity of the vacuum transfer cylinder and/or to prevent the turn velocity or rotation speed of the vacuum transfer cylinder from decelerating, so that the labeling unit can be operated at full performance and maximum speed.

The exemplary control cams and/or pairs of control cams described above and herein can be slideable in the radial direction relative to the longitudinal axis or axis of rotation, respectively, of the vacuum transfer cylinder and/or also slideable in the vertical direction parallel to the longitudinal axis or axis of rotation, respectively, of the vacuum transfer cylinder.

This can enable inter alia easier adaptation of the labeling unit to different label formats, different container formats, and/or different distances between containers to be labeled.

A labeling unit as described above and herein can additionally comprise, for example, a vacuum transfer cylinder that can have at least two groups of vacuum suction bars respectively associated with different labels to be transported, where a group can respectively comprise at least one vacuum suction bar and where the group of vacuum suction bars can be controlled by control cams on different partial circles.

This can also contribute to enabling more efficient, faster, and less-delayed controlling or switching of the vacuum suction bars associated with a label.

As mentioned above, for example, possible control cams can be respectively disposed on an inner partial circle or an outer partial circle, where the outer partial circle has a larger radius than the inner partial circle.

For example, adjacent or consecutive vacuum suction bars or groups of vacuum suction bars respectively associated with a label can be controlled or switched alternately by control cams on an inner partial circle or outer partial circle.

For example, it is conceivable that a first group of vacuum suction bars with a first label is switched or controlled by a first control cam on a first partial circle, e.g. an/the inner partial circle, a second group of vacuum suction bars with a second label is switched or controlled by a second control cam on a second partial circle, e.g. a/the outer partial circle, and a third group of vacuum suction bars with a third label is switched or controlled again by the first control cam on the first partial circle, e.g. a/the outer partial circle.

For the sake of completeness, it is to be mentioned that the term association of vacuum suction bars or groups of vacuum suction bars with a label is to be understood to mean only that these vacuum suction bars or groups of vacuum suction bars can each handle a label or can each be loaded with a label and not that each vacuum suction bar or group of vacuum suction bars associated with a label is/must be loaded with a label.

The concept of vacuum suction bars or groups of vacuum suction bars respectively being associated with a label therefore also only comprises the option that a label or no label, i.e. a gap, can be associated with the vacuum suction bars or the groups of vacuum suction bars.

For example, depending on the number and size of possible gaps in a flow of containers of containers that can be fed to the labeling unit to be labeled, vacuum suction bars or groups of vacuum suction bars that can be associated with a label can optionally not be loaded with a label.

An exemplary labeling machine can have a labeling unit with one, with some, or with all of the features described above and additionally, for example, a conveyor with container receptacles for transporting the containers, in particular the containers to be labeled or the labeled containers, respectively.

The exemplary conveyor can be configured to be linear or as a rotary machine.

An exemplary method for applying labels onto containers in which labels are transferred to a vacuum transfer cylinder of a/the labeling unit, are there attached and conveyed by way of vacuum suction bars, where at least one vacuum suction bar or a group of vacuum suction bars can respectively be associated with each label to be transported and where said at least one vacuum suction bar can have at least one control roller can comprise one, some, or all of the following steps.

Controlling the motion of the at least one vacuum suction bar by at least one bar controller, where the bar controller can comprise at least one control cam which, in interaction with at least one control roller of a vacuum suction bar, can control the motion of the respective vacuum suction bar, and where the at least one vacuum suction bar associated with a label to be transported can be controlled by a control cam of the bar controller or where all vacuum suction bars associated with a label to be transported can be controlled by a control cam of the bar controller, or where a group of vacuum suction bars respectively associated with a label can be controlled by a control cam of the bar controller, respectively.

As mentioned above, all vacuum suction bars that are respectively associated or that can be associated with a label to be transported, or a group of vacuum suction bars that is associated or that can be associated with a label to be transported, can be moved and controlled or switched by a/the control cam of a/the bar controller or by exactly one control cam of a/the bar controller, respectively.

In particular, each label to be transported by the vacuum transfer cylinder can respectively be associated with at least two vacuum suction bars, or a respective group of vacuum suction bars with at least two vacuum suction bars, where at least one of the vacuum suction bars associated with a label to be transported can have at least two control rollers which can be arranged in two different planes.

Said exemplary bar controller can comprise at least two control cams which, in interaction with at least one control roller of a vacuum suction bar, can control or switch the motion of the respective vacuum suction bar.

At least one control cam of the bar controller can there be associated with that plane in which one of the at least two control rollers of the vacuum suction bar having at least two control rollers can be disposed.

In addition, at least one control cam of the bar controller can furthermore be associated with that plane in which a second one of the at least two control rollers of the vacuum suction bar having at least two control rollers can be disposed.

The exemplary bar controller can there respectively control the motion of the at least two vacuum suction bars associated with a label to be transported by way of one of the at least two control cams.

For example, vacuum suction bars, which can each be associated with different to be transported labels, can be controlled by control cams on different partial circles.

For example, at least one control cam can be arranged on an inner partial circle and at least one control cam can be arranged on an outer partial circle, where the outer partial circle has a larger radius than the inner partial circle.

The partial circles can then have a common center point, which can be disposed, for example, on the longitudinal axis or the axis of rotation, respectively, of the vacuum transfer cylinder or on an extension of the longitudinal axis or the axis of rotation of the vacuum transfer cylinder, respectively.

Accordingly, for example, the vacuum suction bars or groups of vacuum suction bars which are respectively associated with different to be transported labels can be controlled alternately by control cams on different partial circles.

For example, adjacent or consecutive vacuum suction bars or groups of vacuum suction bars respectively associated with a label can be controlled or switched alternately by control cams on an inner partial circle or outer partial circle.

For example, it is conceivable that a first group of vacuum suction bars with a first label is switched or controlled by a first control cam on a first partial circle, e.g. an/the inner partial circle, a second group of vacuum suction bars with a second label is switched or controlled by a second control cam on a second partial circle, e.g. a/the outer partial circle, and a third group of vacuum suction bars with a third label is switched or controlled again by the first control cam on the first partial circle, e.g. a/the outer partial circle.

It is there additionally possible that the vacuum suction bars or the groups of vacuum suction bars, which can be respectively associated with different to be transported labels, are controlled by a control cam of at least one pair of control cams, where the control cams of the at least one pair of control cams can be disposed on different partial circles.

In an exemplary case, the control rollers of the vacuum suction bars or the groups of vacuum suction bars, which can be associated with, for example, adjacent labels or label positions or gaps on the vacuum transfer cylinder, can be arranged alternately on/along the exemplary different partial circles (e.g. inner partial circle and outer partial circle) on which the control cams are disposed, so that vacuum suction bars or the groups of vacuum suction bars, which can be respectively associated with a label or a gap, can ever be switched only by a single control cam.

Said groups of vacuum suction bars, which can be respectively associated with different to be transported labels or gaps, can there each have, for example, a leading bar, an end bar, and optionally at least one middle bar.

The exemplary labeling unit, exemplary labeling machine, and the exemplary method for applying labels onto containers described herein provide numerous advantages over known prior art.

For example, regardless of the label format, e.g. in particular regardless of the length of the labels, and/or regardless of the container format and/or regardless of gaps between containers to be labeled in a flow of containers and/or regardless of whether all vacuum suction bars or all groups of vacuum suction bars are loaded with a label or label region, respectively, or only some of the vacuum suction bars or only some of the group of vacuum suction bars are loaded with a label or label region, respectively, and/or regardless of the inflow of labels provided, the vacuum transfer cylinder can be operated at maximum rotational speed or at maximum turn velocity since the vacuum suction bars can always be switched away and switched in quickly enough without, for example, the vacuum transfer cylinder having to be decelerated, for example, to be able to prevent collisions of extended vacuum suction bars/vacuum suction bars not switched back with components/units, e.g. a glue application device, along the periphery of the vacuum transfer cylinder.

This can increase in particular the performance of the labeling unit as well as minimize the risk of possible damage to the labeling unit.

In comparison to conventional techniques for switching vacuum suction bars, the configurations of a labeling unit described herein by way of example can in particular avoid moving control cams unnecessarily and cumbersomely in order to be able to achieve a desired switching operation of a vacuum suction bar.

BRIEF DESCRIPTION OF THE FIGURES

Further exemplary aspects of the invention shall be explained hereafter with reference to the embodiment/s shown in the figures, where.

DETAILED DESCRIPTION

Figure 1:
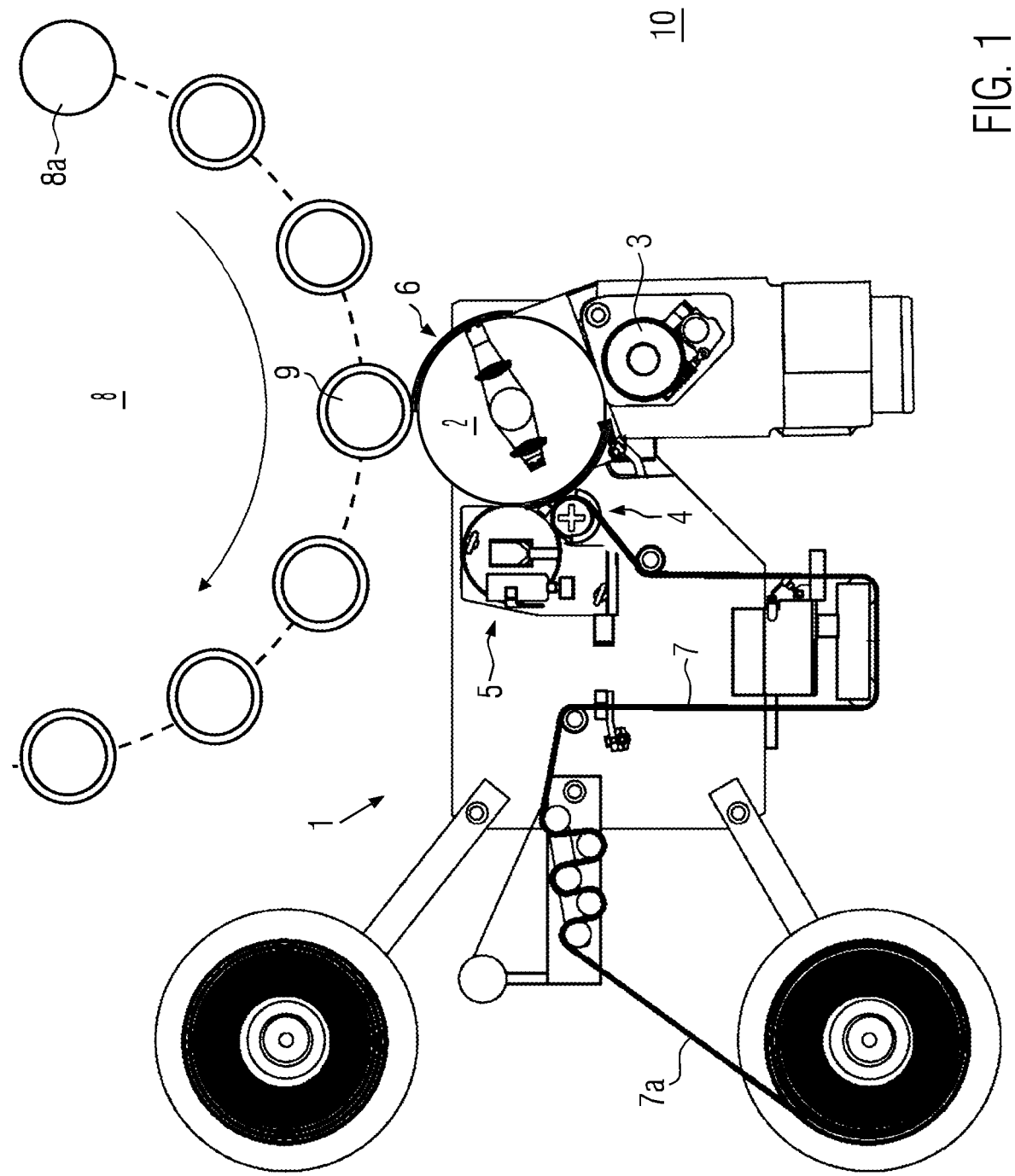
FIG. 1: shows an exemplary labeling machine in a schematic top view

FIG. 1 shows a schematic labeling unit 1 by way of example comprising a vacuum transfer cylinder 2 and a glue application device 3 which is arranged in a stationary manner in the periphery of vacuum transfer cylinder 2.

Furthermore indicated schematically are an example of a possible feed roller 4 and an example of a cutting unit 5 with which labels 6 can be separated from a label strip 7 provided endlessly from the roll in a known manner and can be transferred to vacuum transfer cylinder 2.

Labels 6 can be suctioned at vacuum transfer cylinder 2 in the manner described above and below by vacuum suction bars (not shown) and are e.g. for continuous labelling successively brought into contact with a glue roller 3a formed on glue unit 3 for applying glue.

Labels 6 with the glue applied can then be transferred in the region of a continuously rotatable container carousel 8 to containers 9 to be labeled.

Labeling unit 1 and labeling carousel 8 or conveyor 8, respectively, can be part of a labeling machine 10 which is formed, for example, in a lateral body region, for example, for labeling fully circumferentially containers 9 that are clamped in a centered manner on rotary plates 8a.

Figure 2:
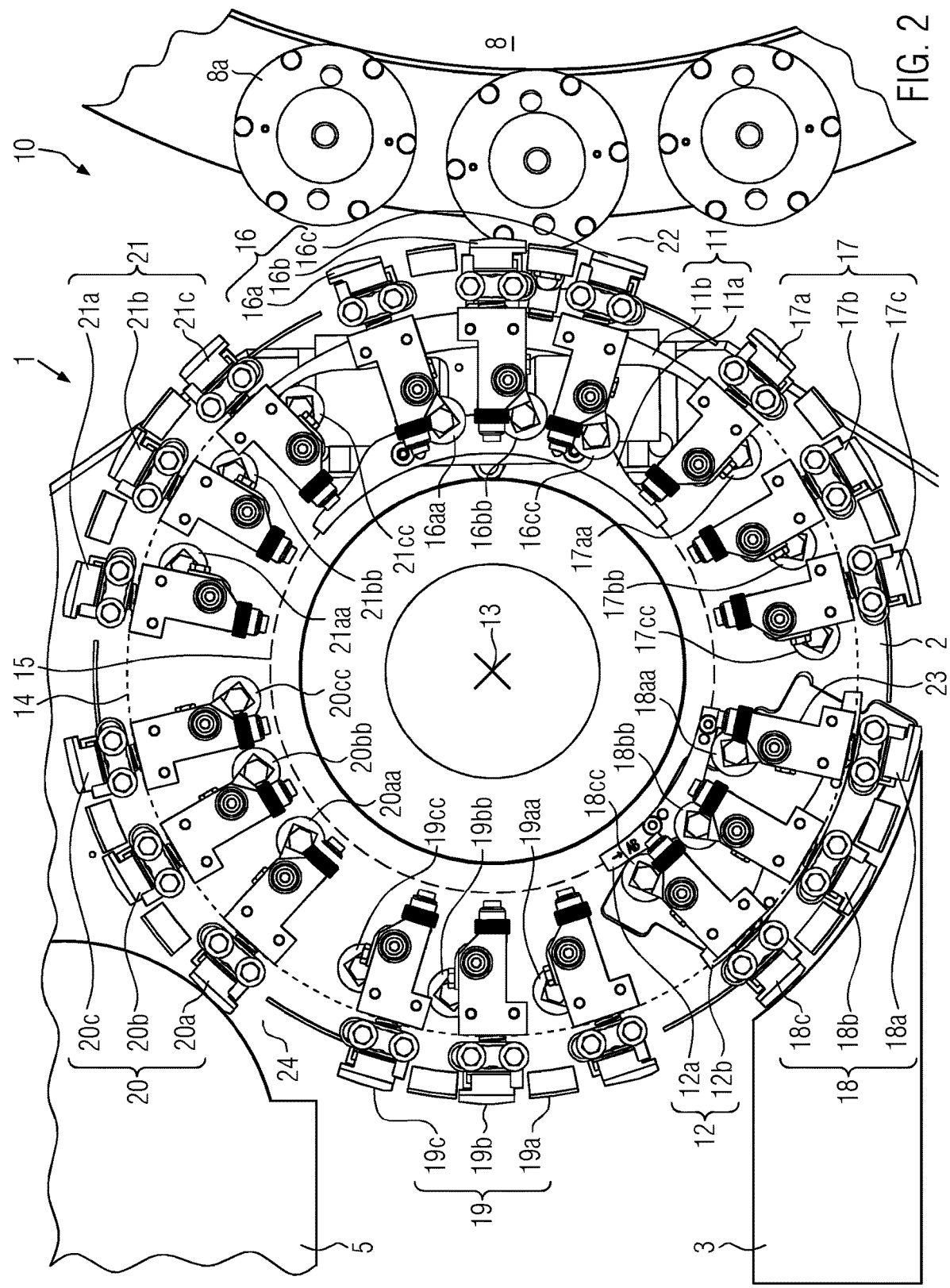
FIG. 2: shows an exemplary labeling unit

FIG. 2 shows by way of example a schematic view of a top view onto an/the exemplary vacuum transfer cylinder 2 of a/the exemplary labeling unit 1 of an/the exemplary labeling machine 10, where the labeling machine can be similar or identical to the labeling machine from FIG. 1 and, for example, can also comprise a conveyor 8, with rotary plates 8a for receiving containers that can be fed to the labeling unit, a glue application device 3, and a cutting unit 5.

For the sake of a more clarity, neither labels nor components of vacuum transfer cylinder 2 which could make it difficult to view or which obstruct the view onto the vacuum suction bars of vacuum transfer cylinder 2 or the view onto the control cams of vacuum transfer cylinder 2 were shown.

Vacuum transfer cylinder 2 can there be rotatable about its longitudinal axis or axis of rotation 13, e.g. counterclockwise.

Vacuum transfer cylinder 2 has, for example, six different groups of vacuum suction bars or groups of bars 16, 17, 18, 19, 20 and 21, respectively, which comprise, for example, three vacuum suction bars each, i.e. group of bars 16 comprises, for example, three vacuum suction bars 16a, 16b, 16b, where a/the bar 16a can be associated with a leading region of a label, i.e. be a leading suction bar 16a, a/the bar 16b can be associated with a middle region of a label, i.e. be a middle suction bar 16b and a/the suction bar 16c can be associated with an end region of a label, i.e. be an end suction bar 16c.

Analogously, groups of bars 17, 18, 19, 20 and 21 can each have, for example, vacuum suction bars 17a, 17b, 17c (group of bars 17), 18a, 18b, 18c (group of bars 18), 19a, 19b, 19c (group of bars 19), 20a, 20b, 20c (group of bars 20) and 21a, 21b, 21c (group of bars 21), where reference character indices a, b, c, as previously for group of bars 16, can reference a respective leading suction bar (a), a middle suction bar (b) and an end suction bar (c) of the respective group of bars.

For example, if vacuum transfer cylinder 2 is fully loaded with labels, i.e. in the event that each group of bars carries a label or is in contact with a label, a maximum of six labels can then be handled and processed simultaneously by vacuum transfer cylinder 2. However, it is also conceivable that not all groups of bars or not all vacuum suction bars, respectively, are occupied/loaded or filled with a label, i.e. for example, the vacuum transfer cylinder therefore carries or processes fewer than six labels.

For example, it would be conceivable that only groups of bars 16, 18, 20 are filled with a label or only groups of bars 17, 19, 21, for example, to take into account a gap or a distance between containers (not shown) of a flow of containers to be processed. For example, only every second rotary plate 8a of conveyor 8 can be loaded with a container to be labeled.

Each vacuum suction bar can be movable in order to perform a radial motion in relation to axis of rotation 13, and can have at least one control roller or be coupled with at least one control roller, respectively, which, in interaction with at least one control cam, can control the motion of the vacuum suction bar(s).

In the example shown, exemplary control rollers are identified by reference characters aa, cc, bb to indicate the association of the control rollers with the respective vacuum suction bars.

For example, reference character 16aa denote the control roller(s) of vacuum suction bar 16a of group of bars 16, reference character 16bb the control roller(s) of vacuum suction bar 16b of group of bars 16, and reference character 16cc the control roller(s) of vacuum suction bar 16c of group of bars 16.

Correspondingly, reference characters 17aa, 17bb, 17cc denote the exemplary control rollers of the vacuum suction bars of group of bars 17, reference characters 18aa, 18bb, 18cc the exemplary control rollers of the vacuum suction bars of group of bars 18, reference characters 19aa, 19bb, 19cc the exemplary control rollers of the vacuum suction bars of group of bars 19, reference characters 20aa, 20bb, 20cc the exemplary control rollers of the vacuum suction bars of group of bars 20, and reference characters 21aa, 21bb, 21cc the exemplary control rollers of the vacuum suction bars of group of bars 21.

It is there to be emphasized that, due to the perspective of FIG. 2, the possible further control rollers associated with a vacuum suction bar, which are located in a further plane, e.g. in a plane below the plane of the visibly drawn control rollers, are not shown or are not visible. In this regard, reference is made to the exemplary three-dimensional lateral perspective in FIG. 3.

It is also shown, for example, that the control rollers of the vacuum suction bars of the groups of bars can be associated with different exemplary partial circles 14, 15, for example, an outer partial circle 14 and an inner partial circle 15.

Exemplary control cams 11a, 11b, 12a, 12b can be arranged or positioned on or along partial circles 14, 15. These control cams 11a, 11b, 12a, 12b are arranged by way of example in pairs of control cams, where pair of control cams 11 is associated by way of example with control cams 11a, 11b and pair of control cams 12 is associated with control cams 12a, 12b.

Exemplary control cams 11a, 11b, 12a, 12b or pairs of control cams 11, 12 can there be positioned below rotating vacuum transfer cylinder 2.

Exemplary control cams 11a, 11b, 12a, 12b, or pairs of control cams 11, 12, can there themselves be movable and optionally moved/slid to a position on/along partial circles 14,15.

For example, control cam 12a can be moved from a position on inner partial circle 15 to a position that is disposed further inside than the radius of inner partial circle 15, and control cam 12b can be moved from a position on outer partial circle 14 to a position that is disposed further outside than the radius of outer partial circle 14.

Control cams 11a, 11b, 12a, 12b or pairs of control cams 11, 12 can be associated with different work regions 22, 23. In the present example, control cams 11a, 11b of pair of control cams 11 are associated, for example, with work region 22 for transferring labels to the containers (not shown) on rotary plates 8a of conveyor 8, and control cams 12a, 12b of pair of control cams 12 are associated, for example, with work region 23 of glue application device 3.

As shown, control cams 11a, 11b, 12a, 12b of a pair of control cams 11, 12 can be disposed opposite one another on different partial circles 14, 15 and each be disposed in a common plane.

However, it is possible inter alia that pairs of control cams 11, 12 can be disposed in different planes.

For example, pair of control cams 12 associated with the work region of glue application device 3 can be disposed on a different plane than pair of control cams 11 associated with work region 22 for the transfer of the labels to the containers.

Again, for reasons of perspective illustration, these possible different planes of the control cams or of pairs of control cams 11, 12, respectively, are not visible in FIG. 2. In this regard, reference is likewise made to the exemplary three-dimensional lateral perspective of FIG. 3.

The planes in which pairs of control cams 11, 12 are disposed can there correspond to at least one plane in which at least one control roller 16aa, 16bb, 16cc, 17aa, 17bb, 17cc, 18aa, 18bb, 18cc, 19aa, 19bb, 19cc, 20aa, 20bb, 20cc, 21aa, 21bb, 21cc of at least one of the vacuum suction bars associated with a label to be transported from one of groups of bars 16, 17, 18, 19, 20, 21 can be disposed, so that, due to the interaction of the contact of the at least one control roller of a vacuum suction bar with a control cam of pairs of control cams 11, 12, the respective vacuum suction bar can be switched accordingly when the control roller runs over the control cam or runs along the control cam as a result of the rotation of the vacuum transfer cylinder.

An exemplary bar controller for controlling/switching the motion of the vacuum suction bars can therefore comprise at least one control cam, e.g. control cams 11a, 11b, 12a, 12b, which, in interaction with at least one control roller of a vacuum suction bar, can controls or switch the motion of the respective vacuum suction bar, e.g. 16a, 16b, 16c, 17a, 17b, 17c, 18a, 18b, 18c, 19a, 19b, 19c, 20a, 20b, 20c, 21a, 21b, or 21c.

In the exemplary case shown, the vacuum suction bars of groups of bars 16, 17, 18, 19, 20, 21 are alternately associated with control cams on different partial circles. This association is only by way of example and can be changed, for example, in that the control rollers of the vacuum suction bars of the groups of bars can be switched over/reconfigured in order to be able to interact with a control cam on a different partial circle, so that, for example, group of bars 16 can be switched also by a control cam/control cams on outer partial circle 14 instead of by a control cam/control cams on inner partial circle 15.

It is to be emphasized that the number of groups of bars shown, the number of vacuum suction bars within a group of bars, the division of the groups of bars and the division of the vacuum suction bars within a group of bars, as well as the association of the groups of bars to a partial circle or to a control cam or a pair of control cams, respectively, are merely by way of example. Other divisions or numbers of the groups of bars or vacuum suction bars, as well as other numbers of control cams or pairs of control cams are also possible. For example, a group of bars can comprise inter alia only two vacuum suction bars, for example, only a leading suction bar and an end suction bar, i.e., for example, a middle suction bar can be dispensed with.

The use of more than two planes for the control cams as well as the use of more than two control rollers for every vacuum suction bar in more than two planes is also conceivable.

Due to the bar controller or due to the interaction of the control rollers with the control cams, the vacuum suction bars can each be switched over between an outer work position and an inner work position, where the radial distance of a vacuum suction bar from the longitudinal axis or axis of rotation 13 of vacuum transfer cylinder 2 in the outer work position is greater than the radial distance of a vacuum suction bar from the longitudinal axis or axis of rotation 13 of vacuum transfer cylinder 2 in the inner work position.

An exemplary possible configuration of labeling unit 1 can be described as follows.

Leading suction bars 16a, 17a, 18a, 19a, 20a, 21a have a control roller, where the control rollers of said leading suction bars are all disposed in the same plane.

Middle suction bars 16b, 17b, 18b, 19b, 20b, 21b and end suction bars 16c, 17c, 18c, 19c, 20c, 21c each have two control rollers which are disposed in two different planes, where one of the two planes is identical to the plane in which the rollers of the leading suction bars are disposed.

The initial position of the/all vacuum suction bars without interaction with a control cam is the extended position/ the outer work position.

No control cams are arranged at work region 24 at cutting rotor 24 at which labels can be received by vacuum transfer cylinder 2.

Inter alia the following exemplary cases can be distinguished at work region 23 for glue application device 3:

Case 1: The Group of Bars Disposed in Work Region 23 is Occupied by/Loaded with a Label All vacuum suction bars of the group of bars in work region 23 are in the outer work position or in the inner work position.

Control cams 12a, 12b in work region 23 can be moved or switched away from the path of the control rollers, i.e. the control rollers run past the control cams 12a, 12b without contacting, or the control cams 12a, 12b can be disposed in the path of the control rollers, i.e. be positioned on/switched onto partial circles 14 or 15.

Case 2: The Group of Bars Disposed in Work Region 23 is not Occupied by/Loaded with a Label All control cams 12a, 12b in work region 23 are moved/ switched into the path of the control rollers, i.e. control cams 12a, 12b are on their associated partial circles 14 or 15. Consequently, all vacuum suction bars of a group of bars disposed in work region 23 are retracted, i.e. in the inner work position. For example, it can thus be prevented that the non-loaded vacuum suction bars are soiled by glue. Depending on which partial circle 14, 15 the control rollers of the group of bars disposed in work region 23 are disposed, the end suction bar and the middle suction bar are controlled or switched either by inner partial circle control cam 12a or outer partial circle control cam 12b.

The following cases can be distinguished analogously at work region 22/at the transfer position of labels to containers.

Case 1: The Group of Bars Disposed in Work Region 22 is Occupied by/Loaded with a Label The leading suction bar of the group of bars disposed in work region 22 is and remains in the outer work position since its control roller is disposed on a different plane than the plane in which control cams 11a, 11b are disposed.

The end suction bar and the middle suction bar of the group of bars disposed in work region 22 are retracted/switched away since one of the respective control rollers of the end suction bar or the middle suction bar is disposed on the same plane as the plane in which control cams 11a, 11b are disposed. Depending on which partial circle 14, 15 the control rollers of the group of bars disposed in work region 22 are disposed, the end suction bar and the middle suction bar are controlled or switched either by inner partial circle control cam 11a or outer partial circle control cam 11b.

Case 2: The Group of Bars Disposed in Work Region 22 is not Occupied by/Loaded with a Label No difference from case 1. The vacuum bars of the group of bars disposed in work region 22 are switched like in case 1. In particular, for example, i.e. the arrangement and position of control cams 11a, 11b can remain unchanged. In other words, control cams 11a, 11b do not need to be moved/switched. For example, they can only be affixed once at the start of operations and, if necessary, only be changed during a conversion, e.g. when changing products.

Figure 3:
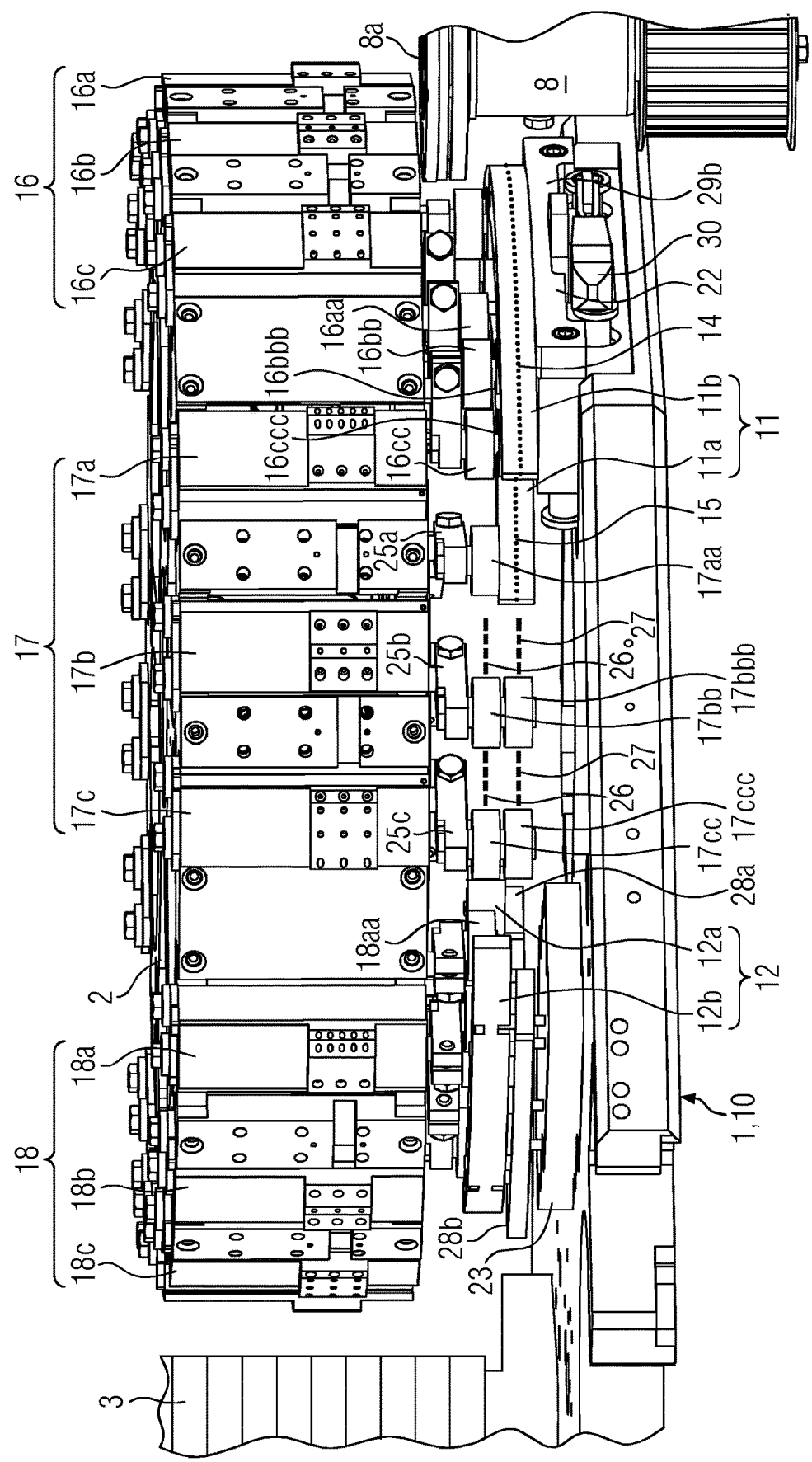
FIG. 3: shows an exemplary perspective side view of a vacuum transfer cylinder

FIG. 3 shows by way of example a perspective side view of a/the vacuum transfer cylinder 2 of a/the labeling unit 1 of a/the labeling machine 10, where vacuum transfer cylinder 2, labeling unit 1, and labeling machine 10 can be identical or similar to the vacuum transfer cylinder, the labeling unit, and the labeling machine from the previous FIGS. 1 and 2.

This exemplary perspective side view advantageously allows for the previously mentioned different planes 26, 27, in which the different control rollers and control cams or pairs of control cams of labeling unit 1 of FIG. 2 are disposed, to be better illustrated.

FIG. 3 shows the same exemplary rotational position of vacuum transfer cylinder 2 as in FIG. 2, where, for example, group of bars 16 (comprising vacuum suction bars 16a, 16b, 16c) is positioned in work region 22, the region of the label transfer from vacuum transfer cylinder 2 to containers (not shown) which can be provided, for example, on rotary plates 8a of a conveyor 8.

Group of bars 18 (comprising vacuum suction bars 18a, 18b, 18c) is disposed, for example, in work region 23, the region where glue can be applied to labels (not shown) by a/the glue application device 3.

Group of bars 17 (comprising vacuum suction bars 17a, 17b, 17c) is disposed, for example, between said work regions 23, 22 and allows for an unobstructed view onto the exemplary control rollers of this group of bars 17.

It can be seen that, for example, leading suction bar 17a has (only) one control roller 17aa in exemplary plane 26, whereas middle suction bar 17b and end suction bar 17c each have two control rollers 17bb, 17bbb or 17cc, 17ccc, respectively, where one of the two respective control rollers of middle suction bar 17b and end suction bar 17c is in same plane 26 as control roller 17aa of leading suction bar 17a.

Control rollers 17aa, 17bb, and 17cc are then in same plane 26, whereas control rollers 17bbb and 17ccc of middle suction bar 17b and end suction bar 17c are both disposed in plane 27, which differs from plane 26 in which control roller 17aa of leading suction bar 17a is located. For example, plane 26 is disposed with respect to the direction of gravity above plane 27.

However, this arrangement is only by way of example and it is also conceivable that, for example, plane 26 can be disposed below plane 27, or that, for example, control roller 17aa of leading suction bar 17a can be disposed in the lower/lowermost plane.

Also likewise shown by way of example and denoted by way of example for group of bars 17 are exemplary lever-type control roller switching mechanisms 25a, 25b, 25c which can allow for the control rollers of the vacuum suction bars to be moved or switched back and forth between different partial circles, e.g. between an inner partial circle 15 and an outer partial circle 14.

The exemplary control roller switching mechanisms can then move all control rollers of a vacuum suction bar simultaneously.

In the exemplary configuration shown, control rollers 17aa, 17bb, 17bbb, 17cc, 17ccc of group of bars 17 are disposed on outer partial circle 14, i.e. all the control rollers of group of bars 17 run along outer partial circle 14, whereas the control rollers of groups of bars 16 and 18 move along inner partial circle 15.

For the sake of clarity, only control roller 18aa of leading suction bar 18a of group of bars 18 is denoted with a reference character, whereas control roller 16aa of leading suction bar 16a as well as of control rollers 16bb, 16bbb, 16cc and 16ccc of middle suction bar 16b and end suction bar 16c from group of bars 16 are denoted with reference characters.

The perspective of FIG. 3 also allows for the exemplary spatial arrangement of control cams 11a, 11b, 12a, 12b or of pair of control cams 11 (comprising control cams 11a, 11b) and of pair of control cams 12 (comprising control cams 12a, 12b), respectively, to be illustrated which are arranged by way of example below vacuum transfer cylinder 2.

Control cams 11a and 11b of pair of control cams 11 are disposed, for example, opposite one another on partial circles 14 and 15, where control cam 11a can be disposed on partial circle 15, inner partial circle 15, whereas control cam 11b can be disposed on partial circle 14, outer partial circle 15.

For example, both control cams 11a and 11b are disposed in the same plane which in the present example is plane 27 and in which the second control rollers of the middle suction bars and the end suction bars of the groups of bars of the vacuum transfer cylinder are respectively likewise disposed, i.e., for example, control rollers 17bbb, 17ccc (group of bars 17), 16bbb, 16ccc (group of bars 16). The second control rollers of the middle suction bars and the end suction bars of groups of bars 18, 19, 20 and 21 are likewise disposed in plane 27 but are not visible/not shown due to the perspective of FIG. 3.

Control cams 12a and 12b of pair of control cams 12 are disposed, for example, opposite one another on partial circles 14 and 15, where control cam 12a can be disposed on partial circle 15, inner partial circle 15, whereas control cam 12*b* can be disposed on partial circle 14, outer partial circle 15.

Control cams 12*a*, 12*b* are there likewise disposed in a common/same plane, namely plane 26 which is disposed above/parallel to plane 27.

Control cams 12*a*, 12*b* can therefore share plane 26 with the upper control rollers of the vacuum suction bars, i.e. with the respective single control roller of leading suction bars 16*a*, 17*a*, 18*a*, 19*a*, 20*a*, 21*a*, i.e. control rollers 16*aa*, 17*aa*, 18*aa*, 19*aa*, 20*aa*, 21*aa*, as well as each with the upper control roller of the middle suction bars and end suction bars, i.e. control rollers 16*bb*, 17*bb*, 18*bb*, 19*bb*, 20*bb*, 21*bb* and 16*cc*, 17*cc*, 18*cc*, 19*cc*, 20*cc*, 21*cc*.

In the exemplary configuration of labeling unit 1 shown, the vacuum bars of groups of bars 16, 18, 20 can be controlled or switched by control cams 11*a*, 12*a* along/on inner circle 15 and the vacuum bars of groups of bars 17, 19, 21 can be controlled or switched by control cams 11*b*, 12*b* along/on outer partial circle 14.

Those vacuum suction bars with control rollers that are disposed in plane 26 can there be controlled or switched by a control cam 12*a*, 12*b* of pair of control cams 12 and those vacuum suction bars with control rollers that are disposed in plane 27 be controlled or switched by a control cam 11*a*, 11*b* of pair of control cams 11.

In other words, the middle suction bars and end suction bars of the groups of vacuum suction bars can be controlled or switched both by a control cam of pair of control cams 11 as well as by a control cam of pair of control cams 12, since the middle suction bars and end suction bars of all groups of vacuum suction bars can each dispose of a control roller in plane 26 as well as a control roller in plane 27.

In the example shown, on the other hand, the leading suction bars of the groups of vacuum suction bars can each be controlled or switched by only one control cam of pair of control cams 12, since said leading suction bars of the groups of vacuum suction bars only have a single control roller which is disposed, for example, only in plane 26.

As mentioned above, control cams 11*a*, 11*b*, 12*a*, 12*b* or pairs of control cams 11, 12, respectively, are themselves movable or slideable and adjustable, respectively. For example, they can be disposed on movable carrier plates 28*a*, 28*b*, 29*a* by which they can be moved/adjusted/switched horizontally and/or vertically.

A possible motion mechanism or switching mechanism for moving the control cams can there furthermore comprise, for example, an electromagnetic or hydraulic switching drive. The switching mechanism for moving control cam 11*b* is denoted, for example, by reference character 30.

The control cams can therefore be moved selectively into partial circles 14, 15 and/or into planes 26, 27 in order to be able to establish contact with the control rollers of the vacuum suction bars co-rotating with the vacuum transfer cylinder in order to be able to control/switch the vacuum suction bars according to a desired operating configuration of the labeling unit.

For the sake of completeness, it is to be mentioned that only some of the reference characters from FIG. 2 have been carried over for reasons of clarity.

Three pages with the figures FIG. 1, FIG. 2, and FIG. 3 follow.

The reference characters are there allocated as follows:
1 labelling unit
2 vacuum transfer cylinder
3 glue application device/glue unit
4 feed roller
5 cutting unit/cutting rotor
6 labels
7 label strip
7*a* roll-off device for label strip
8 conveyor/container carousel/labeling carousel
8*a* rotary plate for receiving containers
9 containers
10 labelling machine
11 exemplary (first) pair of control cams
11*a* exemplary control cam
11*b* exemplary control cam
12 exemplary (second) pair of control cams
12*a* exemplary control cam
12*b* exemplary control cam
13 exemplary axis of rotation/longitudinal axis
14 exemplary (first) partial circle, exemplary outer partial circle
15 exemplary (second) partial circle, exemplary inner partial circle
16 exemplary (first) group of suction bars/group of bars
16*a* exemplary vacuum suction bar/leading suction bar/leading bar
16*b* exemplary vacuum suction bar/middle suction bar/middle bar
16*c* exemplary vacuum suction bar/end suction bar/end bar
16*aa* exemplary control cam(s)
16*bb* exemplary control cam(s)
16*bbb* exemplary control cam(s)
16*cc* exemplary control cam(s)
16*ccc* exemplary control cam(s)
17 exemplary (second) group of suction bars/group of bars
17*a* exemplary vacuum suction bar/leading suction bar/leading bar
17*b* exemplary vacuum suction bar/middle suction bar/middle bar
17*c* exemplary vacuum suction bar/end suction bar/end bar
17*aa* exemplary control cam(s)
17*aa* exemplary control cam(s)
17*bbb* exemplary control cam(s)
17*cc* exemplary control cam(s)
17*ccc* exemplary control cam(s)
18 exemplary (third) group of suction bars/group of bars
18*a* exemplary vacuum suction bar/leading suction bar/leading bar
18*b* exemplary vacuum suction bar/middle suction bar/middle bar
18*c* exemplary vacuum suction bar/end suction bar/end bar
18*aa* exemplary control cam(s)
18*bb* exemplary control cam(s)
18*cc* exemplary control cam(s)
19 exemplary (fourth) group of suction bars/group of bars
19*a* exemplary vacuum suction bar/leading suction bar/leading bar
19*b* exemplary vacuum suction bar/middle suction bar/middle bar
19*c* exemplary vacuum suction bar/end suction bar/end bar
19*aa* exemplary control cam(s)
19*bb* exemplary control cam(s)
19*cc* exemplary control cam(s)
20 exemplary (fifth) group of suction bars/group of bars
20*a* exemplary vacuum suction bar/leading suction bar/leading bar 20b exemplary vacuum suction bar/middle suction bar/middle bar
20c exemplary vacuum suction bar/end suction bar/end bar
20aa exemplary control cam(s)
20bb exemplary control cam(s)
20cc exemplary control cam(s)
21 exemplary (sixth) group of suction bars/group of bars
21a exemplary vacuum suction bar/leading suction bar/leading bar
21b exemplary vacuum suction bar/middle suction bar/middle bar
21c exemplary vacuum suction bar/end suction bar/end bar
21aa exemplary control cam(s)
21bb exemplary control cam(s)
21cc exemplary control cam(s)
22 exemplary work region/work position for transferring labels to containers
23 exemplary work region/work position for applying glue to the labels
24 exemplary work region/work position for receiving labels
25a exemplary control roller switching mechanism
25b exemplary control roller switching mechanism
25c exemplary control roller switching mechanism
26 exemplary first plane
27 exemplary second plane
28a exemplary movable carrier plate for control cam 12a
28b exemplary movable carrier plate for control cam 12b
29b exemplary movable carrier plate for control cam 11b
30 exemplary switching mechanism for control cam 11b

The invention claimed is:

1. Labeling unit for applying labels onto containers, comprising:
at least one roll-off device for a label strip, at least one cutting unit for cutting said label strip into labels,
at least one vacuum transfer cylinder for transferring said labels to said containers, where said vacuum transfer cylinder has a plurality of movable vacuum suction bars for suctioning, conveying, and transferring said labels, wherein each label to be transported is associated with at least two vacuum suction bars from the plurality of movable vacuum suction bars,
a bar controller for controlling the motion of the plurality of movable vacuum suction bars,
where the bar controller comprises at least two control cams, a first control cam and a second control cam, for controlling the motion of the movable vacuum suction bars, wherein said at least two control cams are arranged on two different partial circles having different radii, including the first control cam being arranged on an inner partial circle and the second control cam being arranged on an outer partial circle,
and where for each label to be transported all movable vacuum suction bars associated with a respective label to be transported are only controlled by either the first control cam arranged on the inner partial circle or by the second control cam arranged on the outer partial circle.

2. Labeling unit according to claim 1,
where at least one of said at least two vacuum suction bars associated with one label to be transported has at least two control rollers comprising a first control roller and a second control roller, which are arranged in two different planes, comprising a first plane and second plane, respectively,
and wherein said first control cam is associated with the first plane in which the first control roller is arranged,
and wherein said second control cam is associated with the second plane in which the second control roller is arranged,
and where at least one of the first or second control cam is configured to control the motion of both of said at least two vacuum suction bars associated with the one label.

3. Labeling unit according to claim 1, comprising at least a further pair of control cams, where one control cam of said further pair of control cams is disposed on the inner partial circle and the other control cam of said further pair is disposed on the outer partial circle.

4. Labeling unit according to claim 1, where the first control cam and the second control cam are disposed in the same plane and where this plane corresponds to a plane in which at least one control roller of at least one of said vacuum suction bars associated with a label to be transported is disposed.

5. Labeling unit according to claim 4, wherein the first control cam and the second control cam are arranged in a first plane and further comprise a second pair of control cams in a second plane, where said second plane differs from said first plane and where said second plane corresponds to a plane in which at least one control roller of at least one of said vacuum suction bar associated with a label to be transported is disposed.

6. Labeling unit according to claim 5, comprising a glue application device for applying glue onto labels on said vacuum transfer cylinder before said labels are transferred to said containers, where said first pair of control cams is associated with a work region of said glue application device and said second pair of control cams with a work region for transferring said labels to said containers.

7. Labeling unit according to claim 1, comprising at least two groups of vacuum suction bars which are respectively associated with different labels to be transported, where a group respectively comprises at least one vacuum suction bar and where said groups of vacuum suction bars are controlled by control cams on different partial circles.

8. Labeling unit according to claim 1, where one of said at least two vacuum suction bars respectively associated with a label to be transported is configured for a leading region of said label to be transported and another of said at least two vacuum suction bars respectively associated with a label to be transported is configured for an end region of said label to be transported.

9. Labeling machine with a labeling unit according to claim 1 and with a conveyor with container receptacles for transporting said containers.

10. Method for applying labels onto containers in which labels are transferred to a vacuum transfer cylinder, are attached there and conveyed by the way of movable vacuum suction bars of the vacuum transfer cylinder, wherein each label to be tranpsorted is associated with at least two vacuum suction bars from the plurality of movable vacuum suction bars, comprising:
proividing a label strip on a roll-off device;
cutting the label strip into labels via a cutting unit;
transferring the labels to the containers via the vacuum transfer cylinder, wherein transferring the labels to the containers via the vacuum transfer cylinders comprises suctioning, conveying, and transferring the labels via the plurality of movable vacuum suction bars; and
controlling the motion of-said at least one vacuum suction bar by at least one the movable vacuum suction bars with a bar controller, where said bar controller comprises at least two control cams, comprising-a first control cam and a second control cam, which, in interaction with at least one control roller of the least one vacuum suction bar, controls the motion of the vacuum suction bar, wherein said at least two control cams are arranged on two different partial circles having different radii, including the first control cam being arranged on an inner partial circle and the second control cam being arranged on an outer partial circle, where for each label to be transported, all movable vacuum suction bars associated with a respective label to be transported are controlled only by either the first control cam arranged on the inner partial circle or by the second control cam arranged on an outer partial circle.

* * * * *